(12) United States Patent
Kato

(10) Patent No.: US 7,568,166 B2
(45) Date of Patent: Jul. 28, 2009

(54) APPARATUS FOR DISPLAYING A PART OF AN OBJECT

(75) Inventor: Ryoichi Kato, Tokyo (JP)

(73) Assignee: Sony Corporation (JP)

( * ) Notice: Subject to any disclaimer, the term of this patent is extended or adjusted under 35 U.S.C. 154(b) by 270 days.

(21) Appl. No.: 11/284,730

(22) Filed: Nov. 22, 2005

(65) Prior Publication Data

US 2006/0174213 A1 Aug. 3, 2006

(30) Foreign Application Priority Data

Nov. 22, 2004 (JP) ............................. 2004-337007

(51) Int. Cl.
*G06F 3/00* (2006.01)
*G09G 5/00* (2006.01)
*G01C 21/30* (2006.01)

(52) U.S. Cl. .................. 715/784; 715/785; 715/800; 715/801; 345/684; 701/212

(58) Field of Classification Search ................. 715/800, 715/801, 784, 785; 345/684, 687, 660; 701/200, 701/208, 209, 212
See application file for complete search history.

(56) References Cited

U.S. PATENT DOCUMENTS

| | | | |
|---|---|---|---|
| 5,289,168 A | 2/1994 | Freeman et al. | |
| 5,612,881 A * | 3/1997 | Moroto et al. | 701/209 |
| 5,787,382 A * | 7/1998 | Kurabayashi | 701/214 |
| 6,202,026 B1 * | 3/2001 | Nimura et al. | 701/211 |
| 6,407,749 B1 * | 6/2002 | Duke | 345/684 |
| 6,484,094 B1 * | 11/2002 | Wako | 701/211 |
| 6,587,787 B1 * | 7/2003 | Yokota | 701/212 |
| 6,747,680 B1 | 6/2004 | Igarashi et al. | |
| 6,943,811 B2 | 9/2005 | Matthews | |
| 7,133,054 B2 * | 11/2006 | Aguera y Arcas | 345/666 |
| 7,385,615 B2 * | 6/2008 | Vale et al. | 345/660 |
| 2004/0233222 A1 | 11/2004 | Lee et al. | |
| 2005/0046615 A1 * | 3/2005 | Han | 342/357.06 |
| 2005/0068342 A1 | 3/2005 | Ouchi et al. | |
| 2008/0288166 A1 | 11/2008 | Onishi et al. | |

FOREIGN PATENT DOCUMENTS

| | | |
|---|---|---|
| JP | 3-185496 A | 8/1991 |
| JP | 5-323872 A | 12/1993 |
| JP | 8-069515 A | 3/1996 |
| JP | 2000-292194 A | 10/2000 |
| JP | 2001-021373 A | 1/2001 |

\* cited by examiner

*Primary Examiner*—Kieu D Vu
(74) *Attorney, Agent, or Firm*—Lerner, David, Littenberg, Krumholz & Mentlik, LLP

(57) ABSTRACT

A displaying apparatus is disclosed which displays part of a target object in magnified fashion and scrolls what is being displayed of the target object in accordance with instructions from a user. The displaying apparatus includes an inputting device operable to input the instructions from the user, and a controller operable to control a display device so as to switch the display of the target object in accordance with the input through the inputting device. The controller causes the display device to start scrolling the display so as to zoom out on the target object in response to the scroll instruction from the inputting device, and to either zoom in on the target object until an initial scale of the target object is restored before ending the scroll, or to terminate the scroll so as to zoom in on the target object until the initial scale thereof is restored.

5 Claims, 9 Drawing Sheets

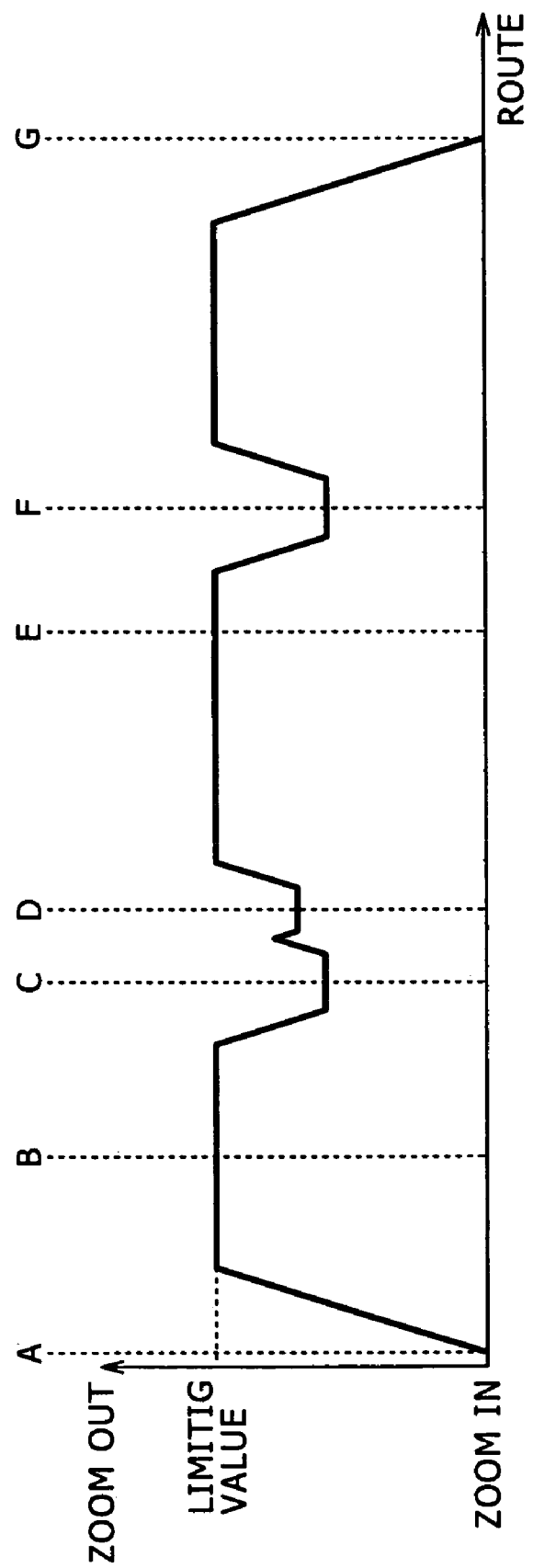

APPARATUS FOR DISPLAYING A PART OF AN OBJECT

CROSS-REFERENCE TO RELATED APPLICATIONS

The present application claims priority from Japanese Patent Application No. 2004-337007 filed on Nov. 22, 2004, the disclosure of which is hereby incorporated by reference herein.

BACKGROUND OF THE INVENTION

The present invention relates generally to a displaying apparatus, a displaying method, a displaying program, and a recording medium which holds the displaying program; and more particularly to a car navigation system. The invention envisages starting to scroll a display in response to scroll instructions by zooming out on the object being displayed, then either zooming in on the object of interest until its initial scale is restored before ending the scroll, or terminating the scroll so as to zoom in on the object until its initial scale is restored, whereby the ease of use in scrolling displays is improved.

Generally, car navigation systems display maps for guiding the user to the desired destination. Such car navigation systems scroll the map display in accordance with the user's operations, allowing the user to search for or check the location of interest.

Various improvements in the technique of scrolling have been proposed. Illustratively, Japanese Patent Laid-open No. 2000-292194 discloses ways to improve the ease of scrolling by changing the scroll speed in keeping with the user's operations.

When it is desired on a typical car navigation system to display a location farther than the currently displayed location, it takes a correspondingly longer time to scroll the display to look up the desired location. This can lower the ease of use of the system. If the speed of scroll is raised too high, it becomes difficult for the user to keep track of what is being displayed. This can be another factor contributing to the worsening of the ease of use.

Scrolling the display over a long distance often makes it difficult for the user to grasp the geographical relations between the currently displayed location and the desired destination. This can be yet another factor responsible for reducing the ease of use of the car navigation system. The difficulty in keeping track of the geographical changes being displayed is highlighted if the user has a poor sense of the locality regarding the currently displayed location or the desired destination or if the scale of the map is not displayed.

In order to counter such disadvantages, it has been proposed that the car navigation system zoom out on the currently displayed location on the map and scroll the display to get the desired destination displayed at the center, before zooming in on the location of interest so as to restore the initial scale of the map. With its zoom-out procedure, the proposed technique can shorten the time to scroll the display. The zoom-out display further allows the user to keep track of the geographical relations between the currently displayed location and the desired destination. However, it may be quite bothersome for the user to carry out such zoom-out, scroll, and zoom-in operations. While the car is on the move, practicing the proposed technique may even jeopardize the user's safe driving.

SUMMARY OF THE INVENTION

The present invention has been made in view of the above circumstances and provides a displaying apparatus, a displaying method, a displaying program, and a recording medium holding the displaying program for improving the ease of use in scrolling displays.

According to one embodiment of the present invention, there is provided a displaying apparatus for displaying part of a target object in enlarged fashion and for scrolling what is being displayed of the target object in accordance with instructions from a user, the displaying apparatus including an inputting device operable to input the instructions from the user; and a controller operable to control a display device so as to switch the display of the target object in accordance with the input from the inputting device; wherein the controller causes the display device to start scrolling the display so as to zoom out on the target object in response to the scroll instruction from the inputting device, and to either zoom in on the target object until an initial scale of the target object is restored before ending the scroll, or to terminate the scroll so as to zoom in on the target object until the initial scale thereof is restored.

According to another embodiment of the present invention, there is provided a method for displaying part of a target object in enlarged fashion and for scrolling what is being displayed of the target object in accordance with instructions from a user, the displaying method including scrolling the display so as to zoom out on the target object in response to a scroll instruction; and either zooming in on the target object until an initial scale of the target object is restored before ending the scroll, or terminating the scroll so as to zoom in on the target object until the initial scale thereof is restored.

According to a further embodiment of the present invention, there is provided a recording medium recorded with a program for performing a method for displaying part of a target object in enlarged fashion and for scrolling what is being displayed of the target object, the method including scrolling the display so as to zoom out on the target object in response to a scroll instruction; and either zooming in on the target object until an initial scale of the target object is restored before ending the scroll, or terminating the scroll so as to zoom in on the target object until the initial scale thereof is restored.

Where the displaying apparatus of the present invention is in use, part of the target object is displayed in enlarged fashion, and what is being displayed of the target object is scrolled in accordance with instructions from the user. The inputting device of the displaying apparatus inputs the instructions from the user, and the controller of the apparatus controls the display device so as to switch the display of the target object in response to the scroll instruction coming from the inputting device. The controller causes the display device to start scrolling the display so as to zoom out on the target object in response to the scroll instruction from the inputting device, and to either zoom in on the target object until the initial scale of the target object is restored before ending the scroll, or to terminate the scroll so as to zoom in on the target object until the initial scale thereof is restored. This structure shortens the time to scroll the display by an amount corresponding to the zoom-out and scroll operations. The inventive structure also allows the user to keep track of what is being displayed with ease. The structure further permits the user to grasp the geographical relations between the currently displayed location and the desired destination.

Where the above-outlined displaying apparatus, displaying method, and recording medium holding the displaying program are implemented according to the present invention, the display of the target object is scrolled in a significantly easier manner than before.

Further objects and advantages of the present invention will become apparent upon a reading of the following description and appended drawings.

BRIEF DESCRIPTION OF THE DRAWINGS

FIGS. 6A, 6B and 6C are plan views of map displays given by the system of FIG. 2;

FIG. 9 is a characteristic curve diagram showing changes in the scale of the map display given by the procedure of FIG. 7.

DETAILED DESCRIPTION

Preferred embodiments of the present invention will now be described with reference to the accompanying drawings.

First Embodiment

Structure of the First Embodiment

Figure 2:
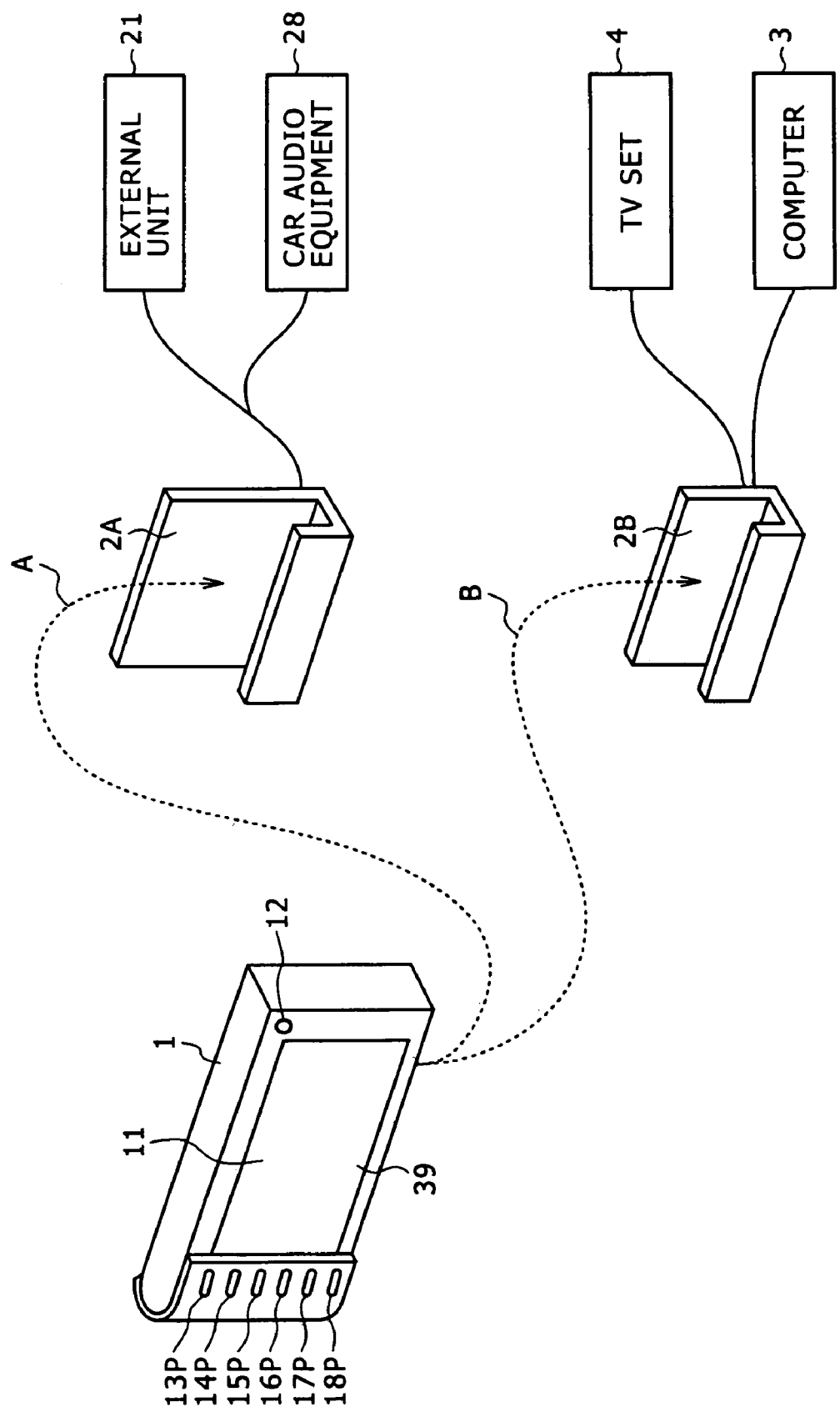
FIG. 2 is a schematic view showing a system configuration of the car navigation system embodying the present invention.

FIG. 2 is a perspective view showing a car navigation system 1 practiced as an embodiment of the present invention. The car navigation system 1 is a multimedia terminal which, besides offering car navigation functions, provides capabilities of a content offering apparatus capable of reproducing audio and video data. For use, the car navigation system 1 is placed into a cradle 2A on board a vehicle as indicated by arrow A. The onboard cradle 2A is made of a plate with a suitable thickness and is attached to the center console of the vehicle.

The bottom end of the car navigation system 1 has the terminals for various data input and output. When the car navigation system 1 is set into the onboard cradle A2, the system 1 has the terminals at its bottom connected to the cradle A2 to receive power and to exchange diverse kinds of data necessary for system operation.

The car navigation system 1 may be detached from the onboard cradle 2A and taken home. The system 1 may then be mounted on another cradle 2B installed in the household. Through the household cradle 2B, the car navigation system 1 may be connected to a computer 3 and a TV set 4.

With the car navigation system 1 placed in the household cradle 2B, the computer 3 uploads and downloads files to and from the system 1, the files being needed by the system 1 acting as a multimedia terminal. More specifically, the computer 3 activates an application program corresponding to the car navigation system 1 and thereby uploads and downloads relevant files to and from the car navigation system 1 through the household cradle 2B. These files include AV content-related files, e-mail files, and navigation-related map files. The AV content-related files further include movie files, TV program files, and music files.

The car navigation system 1, when connected to the TV set 4 via the household cradle 2B, serves as a multimedia terminal that presents the user with diverse kinds of content through the TV set 4. The system 1 may further carry out navigation functions such as route searches by getting maps displayed on the TV set 4.

The car navigation system 1 has a display screen 11 furnished at its front, the screen 11 displaying content and other information when the system 1 is used on board the vehicle. On top of the display screen 11 is a touch panel 39 that detects operations performed on it by the user. In the top right corner of the display screen 11 is a power switch 12. On the side of the panel opposite from the power switch 12 are controls 13P through 18P for regulating sources, programs, menus, displays, maps, and sound volume respectively.

Figure 3:
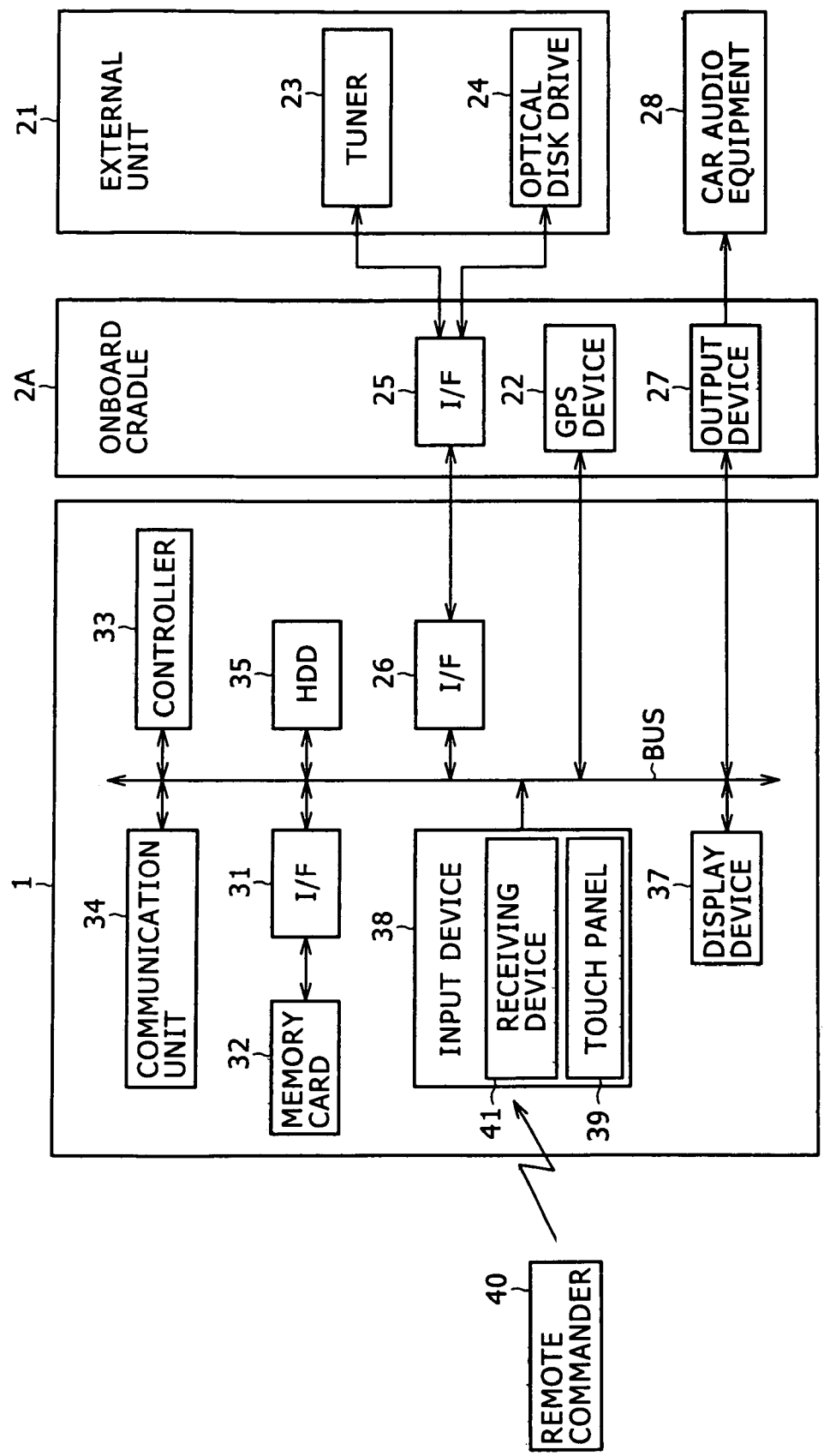
FIG. 3 is a block diagram of the car navigation system embodying the invention.

FIG. 3 is a block diagram of the car navigation system 1 embodying the invention together with related structures. The car navigation system 1 is connected to an external unit 21 via the onboard cradle 2A. The external unit 21 is located illustratively under the passengers' seat and includes a tuner 23 and an optical disk drive 24.

The tuner 23 under control of the car navigation system 1 receives TV broadcast waves as well as traffic information offered by VICS (Vehicle Information and Communication System), and outputs the received video data, audio data, and traffic information to the onboard cradle 2A. In turn, the car navigation system 1 mounted on the onboard cradle 2A allows passengers to enjoy the TV broadcast and to inform the user of the acquired traffic information.

The optical disk drive 24, also under control of the car navigation system 1, reproduces data from optical disks such as DVD (Digital Versatile Disk) or CD (Compact Disc) and outputs the reproduced video and audio data to the onboard cradle 2A. The car navigation system 1 placed in the onboard cradle 2A then admits the output data from the cradle 2A through an auxiliary input terminal (AUX) and allows the passengers to enjoy the AV content derived from various optical disks.

The onboard cradle 2A has a GPS device 22 and an audio output device 27. The GPS device 22 detects the current location of the vehicle with respect to what is known as the GPS (Global Positioning System). Under control of the car navigation system 1, the GPS device 22 detects and outputs information about the current location. The current location information detected by the GPS device 22 allows the car navigation system 1 mounted on the onboard cradle 2A to carry out navigation-related processing.

The output device 27 acquires audio data from the car navigation system 1 and converts the acquired data into analog signals that are output on FM radio waves through an external output terminal. That is, with the car navigation system 1 mounted on the onboard cradle 2A, the output device 27 outputs audio signals to car audio equipment 28 of the vehicle in wired or wireless fashion for audio signal output.

The household cradle 2B has a similar output device capable of outputting audio and video signals in a wired manner. With the car navigation system 1 mounted on the cradle 2B, the output device presents the user with diverse kids of AV content on the TV set 4.

When the car navigation system 1 is placed into the onboard cradle 2A, an interface 26 of the system 1 is connected to an interface 25 (I/F) of the cradle 2A so that diverse kinds of data output to or input from the external unit 21 are exchanged between the two interfaces.

The interface 26 operates under control of a controller 33 of the car navigation system 1 and, with the system 1 mounted on the onboard cradle 2A, exchanges various items of data with the external unit 21 and outputs and inputs the exchanged data to and from a bus in the system 1. If the car navigation system 1 is mounted on the household cradle 2B, the interface 26 may upload and download data to and from the computer 3.

Another interface (I/F) 31 in the car navigation system 1 operates under control of the controller 33 and exchanges data with a memory card 32 loaded into a card slot on the side of the system 1, or outputs and inputs the exchanged data to and from the bus. This arrangement allows the car navigation system 1 illustratively to import from the memory card 32 still pictures taken by an electronic still camera or to record internally stored still pictures to the memory card 32.

A communication unit 34 sends and receives data to and from a wireless LAN (Local Area Network). Under control of the controller 33, the communication unit 34 transmits the data output onto the bus over to the network, acquires desired data via the network, and outputs the acquired data onto the bus. The communication unit 34 thus allows the car navigation system 1 to access the Internet and to send and receive emails.

A hard disk drive (HDD) 35 retains programs, content, and other data related to the processing of the car navigation system 1 and, under control of the controller 33, outputs such data onto the bus. That is, the hard disk drive 35 holds data in various files input from external devices via the interfaces 26 and 31, diverse kinds of data acquired through the communication unit 34, any data to be output to the external devices, and e-mail data. Any of the data retained on the hard disk drive 35 may be output as needed onto the bus. Although the programs kept on the hard disk drive 35 are assumed here to be preinstalled, this is not limitative of the invention. Alternatively, the programs may be recorded to the hard disk drive 35 after being downloaded from recording media via the interface 26 or 31 or from the network via the communication unit 34. In such cases, the recording media may be any one of optical disks, memory cards, magnetic tapes, or other suitable storage media.

A display device 37 of the car navigation system 1 is composed illustratively of a liquid crystal display constituting the display screen 11 mentioned above with reference to FIG. 2. Under control of the controller 33, the display device 37 displays diverse kinds of content, maps and other data.

An input device 38 of the car navigation system 1 is constituted by arrangements for detecting the user's operations on the touch panel 39 of the display screen 11, by a receiving device 41 for receiving remote control signals output from a remote commander 40, and by an interface for detecting the user's operations on the controls 13P through 18P for regulating sources, programs and others. The user-initiated manipulations detected by any of these devices are reported to the controller 33. The above setup causes the car navigation system 1 to switch its performance in response to the operations carried out on the controls 13P through 18P on the side of the display screen 11, on the touch panel 39 on top of the display screen 11, or on the remote commander 40.

The remote commander 40 has controls that correspond functionally to the controls 13P through 18P of the car navigation system 1 as well as to menu-driven scrolling keys and other operational elements on the display screen 11. Operating any of these controls causes the remote commander 40 to output corresponding remote control signals on infrared rays.

The controller 33 is a processing device that executes relevant programs held on the hard disk drive 35 in response to the user's operations on the controls of the remote commander 40 or other operations detected via the input device 38, thereby carrying out navigation processes reflecting the user's intentions or offering diverse kinds of content as desired by the user. With this embodiment, the programs related to the processing of the controller 33 are assumed to be preinstalled in the car navigation system 1. Alternatively, these programs may be downloaded over the network such as the Internet or installed from suitable recording media. The recording media may be any one of optical disks, memory cards, magnetic tapes, or other suitable storage media.

More specifically, when instructed by the user to offer content, the controller 33 responding to the user's operations acquires video or audio content from the tuner 23, optical disk drive 24, or hard disk drive 35 and provides the acquired content via the display device 37 or car audio equipment 28. When instructed to browse the Internet, the controller 33 activates browser software and causes the communication unit 34 to access the Internet. Video data obtained by the communication unit 34 are displayed on the display device 37 and output audio data through the output device 27 respectively. When instructed to process e-mails, the controller 33 activates a mailer program and causes the display device 37 to display e-mails held on the hard disk drive 35 or acquires emails to be displayed through the communication unit 34. Furthermore, the controller 33 accepts the user's input of emails and transmits the input e-mails via the communication unit 34. When instructed to display still pictures, the controller 33 acquires files of the designated still pictures from the memory card 32 or hard disk drive 35 and causes the display device 37 to display the still pictures taken from the acquired files.

When instructed by the user to display a map, the controller 33 acquires information about the current location from the GPS device 22, loads map data from the hard disk drive 35 in reference to the current location information, and causes the display device 37 to display the map based on the loaded map data. If the user selects the process of navigation up to a given location, the controller 33 accepts the user's input of the desired destination, acquires current location information from the GPS device 22, and carries out searches for possible routes to the destination on the basis of the input destination and the acquired information. With an appropriate route determined, the controller 33 displays the map and outputs various kinds of information in keeping with the user's settings so as to guide the user along the route to the desired destination.

With the map thus displayed, the controller 33 enlarges or contracts the displayed map or switches the display type to a bird's eye-view in response to the user's operations on the remote commander 40 or on the touch panel 39. If the user designates scrolling of the map display, the controller 33 first scrolls the map while zooming out on it, then zooms in on the map until its initial scale is restored. On the remote commander 40, for example, the designation of scrolling is given by operation of a joystick or of an operational element for designating a particular scrolling direction. On the touch panel 39, the designation of scrolling is effected illustratively by touching with the user's fingertips a desired position away from the center of the screen for the period of time in which to make the scroll, or by sliding the fingertips on the panel surface in a desired scrolling direction away from the center of the screen, before keeping the fingertips in contact with the panel surface as long as it takes to effect the scroll.

Figure 1:
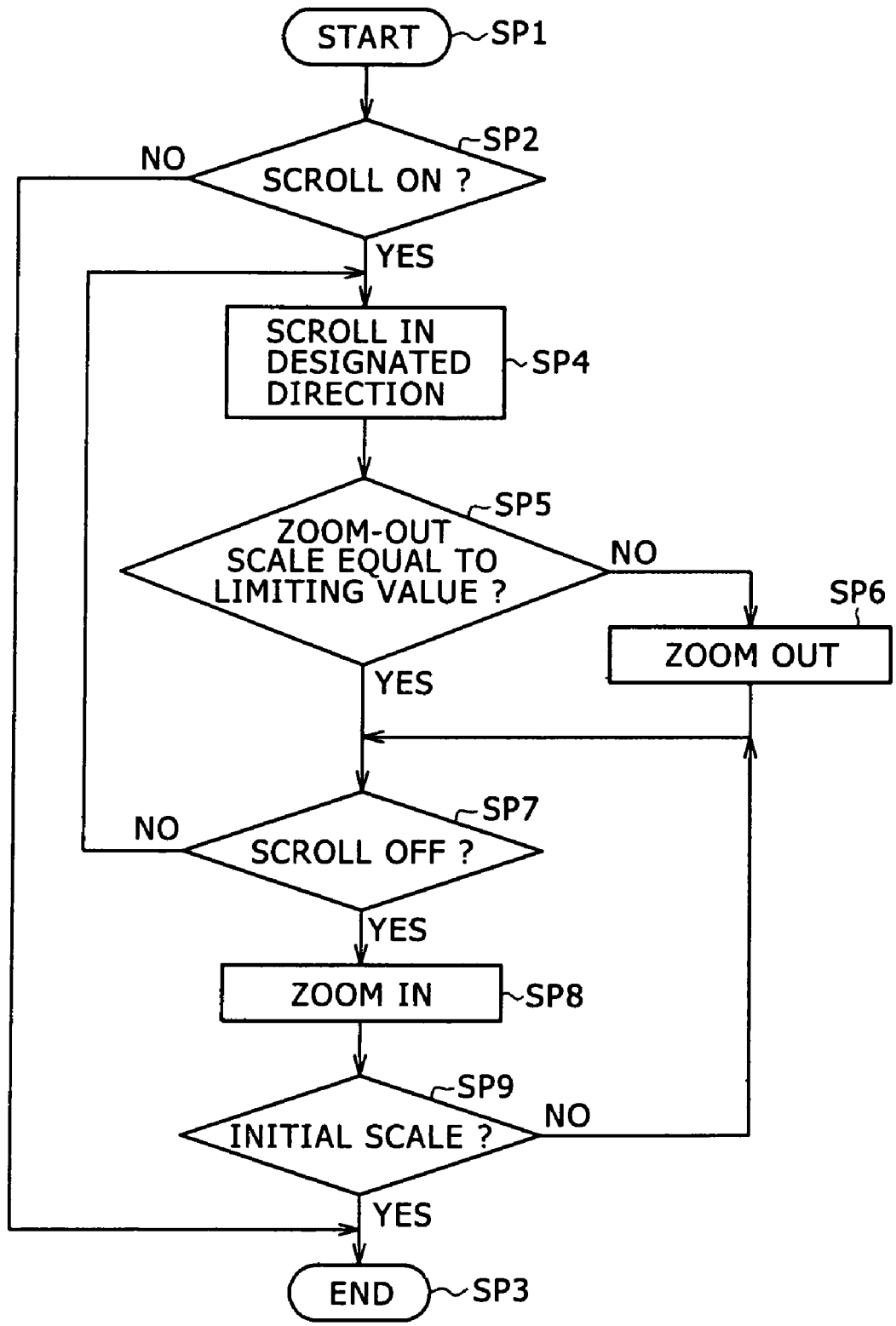
FIG. 1 is a flowchart of steps constituting a procedure carried out by the controller of a car navigation system practiced as an embodiment of the present invention.

When detecting the user's operation on the remote commander 40 or on the touch panel 39, the controller 33 starts its procedure in step SP1 of FIG. 1 and goes to step SP2. In step SP2, the controller 33 checks to determine whether the detected operation designates scrolling. If the result of the check in step SP2 is negative, the controller 33 goes from step SP2 to step SP3 and terminates the procedure.

Figure 4:
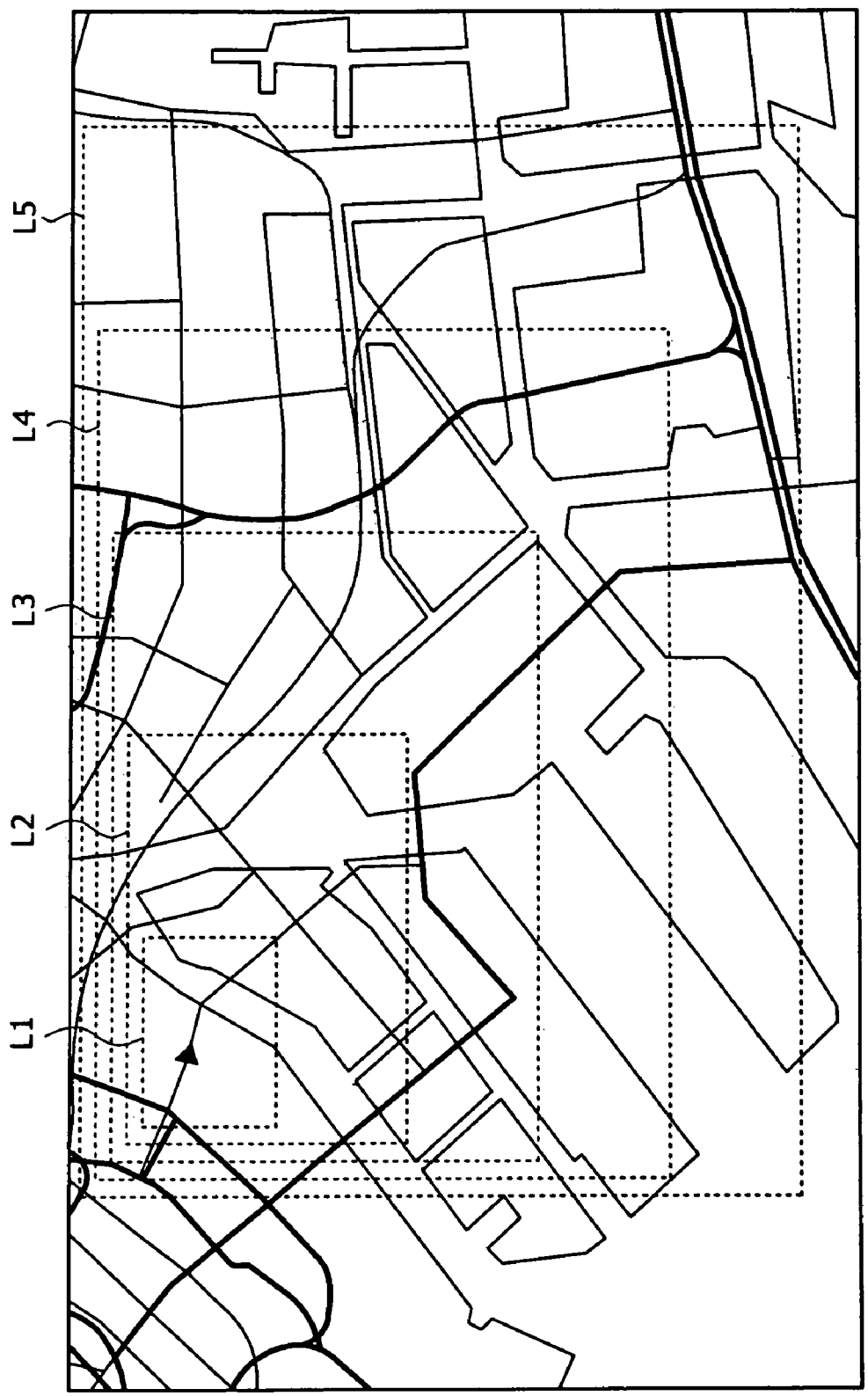
FIG. 4 is a plan view of a map display on which the procedure of FIG. 1 zooms out when executed.

If in step SP2 the detected operation is found to be one that designates scroll, the controller 33 goes to step SP4 from step SP2. In step SP4, the controller 33 scrolls the screen display in the direction specified by the user. In step SP5, the controller 33 checks to determine whether the current zoom-out scale has become equal to a previously established limiting value. If the result of the check in step SP5 is negative, the controller 33 goes from step SP5 to step SP6. In step SP6, the controller 33 zooms out on the map display by reducing the scale of the map by an amount corresponding to the scroll as instructed in step SP4. More specifically, the controller 33 zooms out on the display of the display device 37 while moving the center of the zoom-out process by an amount corresponding to the scroll, as indicated in FIG. 4 by reference characters L1 and L2 on the map displayed on the display device 37. The displayed area of the map is thus enlarged in the scrolling direction designated by the user.

If in step SP5 the current zoom-out scale is found equal to the previously established limiting value, then the controller 33 goes directly to step SP7. More specifically, with the map scale having reached the limiting value, the controller 33 stops the zoom-out process and simply scrolls the map display.

In step SP7, the controller 33 checks to determine whether the user's scrolling operation is stopped. If the result of the check in step SP7 is negative, the controller 33 returns from step SP7 to step SP4.

As described, the controller repeats steps SP4, SP5, SP6, SP7 and SP4, in that order. As indicated by reference characters L1 through L5 in FIG. 4, the map displayed on the display device 37 has its center moved progressively during the zoom-out process in the direction opposite to the scrolling direction designated by the user. In this manner, the map area being displayed is gradually enlarged for the zoom-out effect and scrolled in the user-designated direction. When the zoom-out scale reaches the previously established limiting value, the controller 33 repeats steps SP4, SP5, SP7 and SP4, in that order, to stop the zoom-out process and scroll the map display.

The limiting value used in the check of step SP5 represents a maximum zoom-out map display scale established beforehand by the user or by the program executing the above procedure. The limiting value may be selected simply as a predetermined scale value or as a predetermined magnification of the initial map display scale in effect at the start of scrolling. As another alternative, the limiting value may be established variably by a learning mechanism that adaptively takes into account the map scrolling distances retrieved from records reflecting the user's navigation usage in the past.

When the user's scroll instruction is stopped following the display zoom-out process, the controller 33 goes from step SP7 to step SP8. In step SP8, the controller 33 zooms in on the map display by raising the scale as opposed to what took place during the zoom-out process. Wit this embodiment, the controller 33 sets the center of the zoom-in process in the middle of the screen of the display device 37 before zooming in. In step SP9, the controller 33 checks to determine whether the map display scale following the zoom-in process has returned to the scale in effect before the procedure began. If the result of the check in step SP9 is negative, the controller 33 returns to step SP7.

Figure 5:
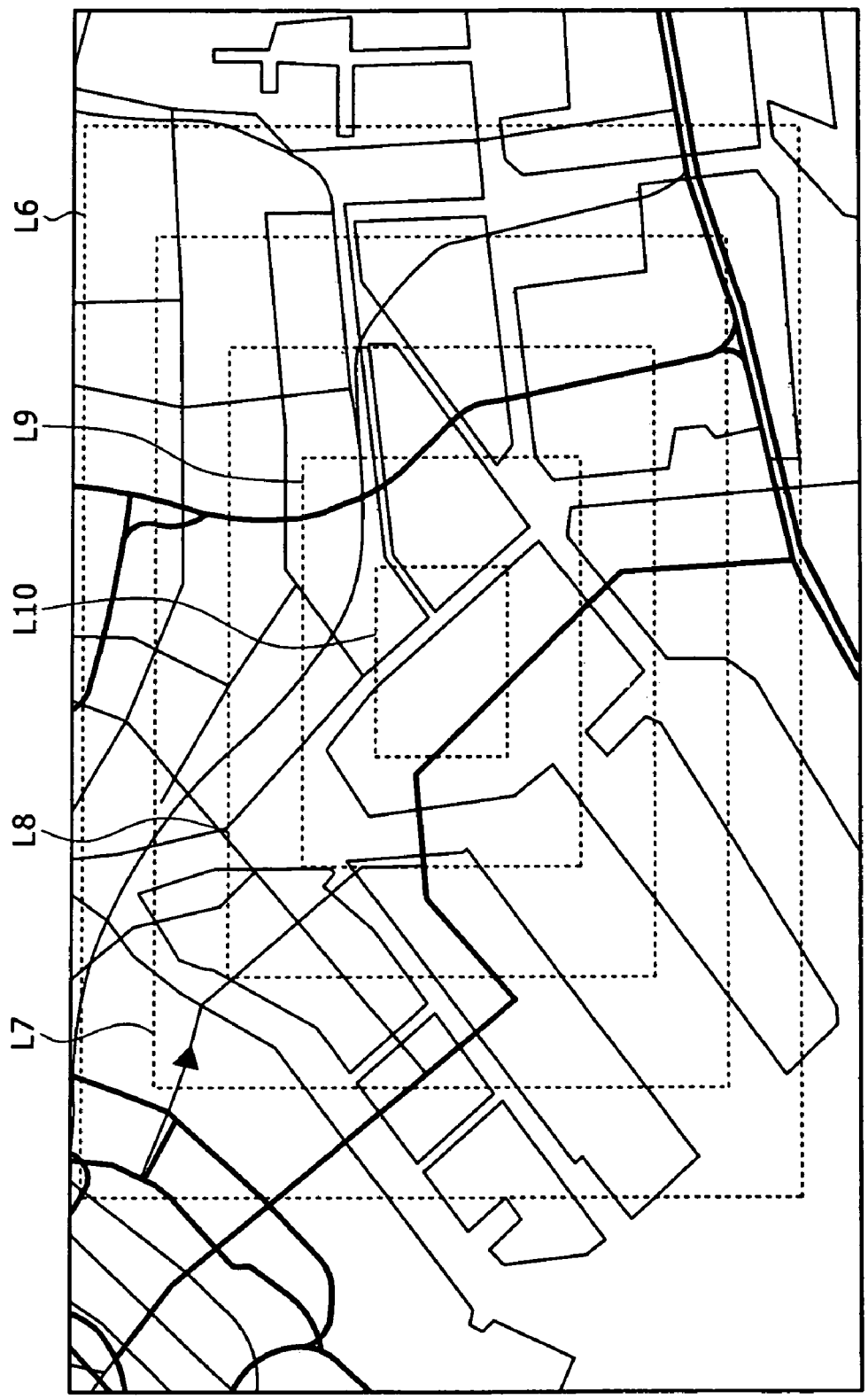
FIG. 5 is a plan view of a map display on which the procedure of FIG. 1 zooms in when executed.

The scale of the map displayed on the display device 37 is thus returned to the initial map scale as indicated approximately in FIG. 5 by reference characters L6 through L10 in contrast to FIG. 4.

The controller 33 carries out the above zoom-in and zoom-out processes in a manner varying the scale continuously so that the displayed images change smoothly in scale when viewed. In addition, the zoom-in and zoom-out processes are performed so that the changes in scale are linear, i.e., so that the scale is expressed by a linear function with time set as its variable. This feature is intended to suppress awkward or abrupt display changes during zoom-in and zoom-out processes.

When the map is displayed on the display device 37, the zoom-out process is carried out with the amount of scroll determined in such a manner that the map display at the center of the screen is moved at a constant speed. As opposed to the execution of scroll without the zoom-out effect, this feature shortens the time it takes to display the destination. With this embodiment, the actual geographic features corresponding to the center of the display screen are moved at progressively higher speeds as the map scale is being reduced.

Figure 6A:
Figure 6B:
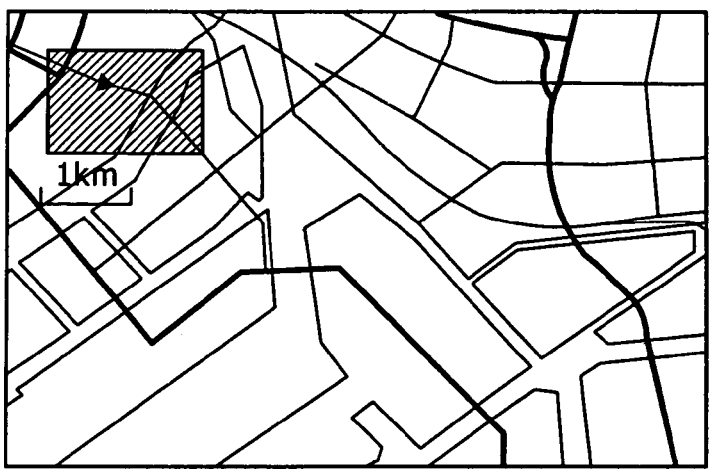
Figure 6A:

FIGS. 6A through 6C show typical maps with their scales reduced successively. The area displayed on the initial scale is marked in each of the figures. With this embodiment, if the difference between the current and the initial scales is smaller than a predetermined value, then the area displayed on the initial scale is shown enclosed by four hook-shaped marks, as indicated in FIG. 6A. When the scale is made smaller, the area displayed on the initial scale is shown hatched in a rectangle, as indicated in FIG. 6B. When the scale is made smaller still, the area displayed on the initial scale is pointed to by a cursor, i.e., by an intersection of lines extending horizontally and vertically as shown in FIG. 6C.

The controller 33 also gives indications denoting each of these scales of the map displayed. In FIGS. 6A through 6C, the scale indications on the display represent geographical distances.

With the initial map scale restored following the zoom-in process, the controller 33 goes from step SP9 to step SP3 and terminates this procedure. If the user again issues a scroll instruction during the zoom-in process, it probably signifies that the destination is outside the current screen of the display device 37. In that case, the result of the check in step SP7 is negative, so that the controller 33 returns to step SP4 for further scrolling as designated by the user while again zooming out on the map display.

When a search for the destination is made with this embodiment by scrolling the map, the time required to perform the scroll is shortened by an amount corresponding to the zoom-out process that allows the user to keep track of what is being displayed. This makes it easier for the user to grasp the geographical relations between the currently displayed location and the desired destination.

In response to the user's operations, the controller 33 displays a cursor and icons on the displayed map and accepts the setting of the location to be reached through navigational processing. The controller 33 may also display detailed information about facilities, shops and other landmarks in the vicinity.

When the user specifies that a route simulation be made by the navigation system, the controller 33 scrolls the display screen in a manner tracing the detected route from the current location to the destination. At this point, as discussed above in connection with the user's scrolling operation, the controller 33 scrolls the map display while carrying out a zoom-out process. When the locality of the destination is reached, the controller 33 zooms in on the map display until the initial scale of the map is restored before stopping the scroll. During the scroll, the controller 33 may temporarily zoom in on the map display in accordance with different degrees of interest specific to landmarks and facilities along the route.

The degree of interest is a parameter that indicates how much of the user's attention should be drawn to a given location on the map displayed by the car navigation system 1. The locations that should draw the user's attention during driving, such as urban areas, intersections, junctions, and toll gates are assigned high degrees of interest; winding roads, sharp bends, and the like are assigned intermediate degrees of interest; linear stretches, mountainous regions, and straight roads such as expressways are given low degrees of interest. Degrees of interest are also assigned to the facilities and shops which are likely to be frequented by the user. For example, the facilities highly likely to be utilized by the user, such as parking area and service area, are assigned high degrees of interest, whereas such facilities as roadside gas stations and convenience stores facing the general road are given intermediate degrees of interest. Other landmarks such as restaurants and recreational facilities may also be assigned relevant degrees of interest. In this connection, the user's preferences may be derived from the destinations, transit points, and stopovers selected or visited by the user in the past. The preferences thus determined may be used as the basis for establishing the degrees of interest in different categories of landmarks and facilities. In the controller 33, the locations, facilities and topographical features are stored beforehand in correspondence with the above-described degrees of interest.

Figure 7:
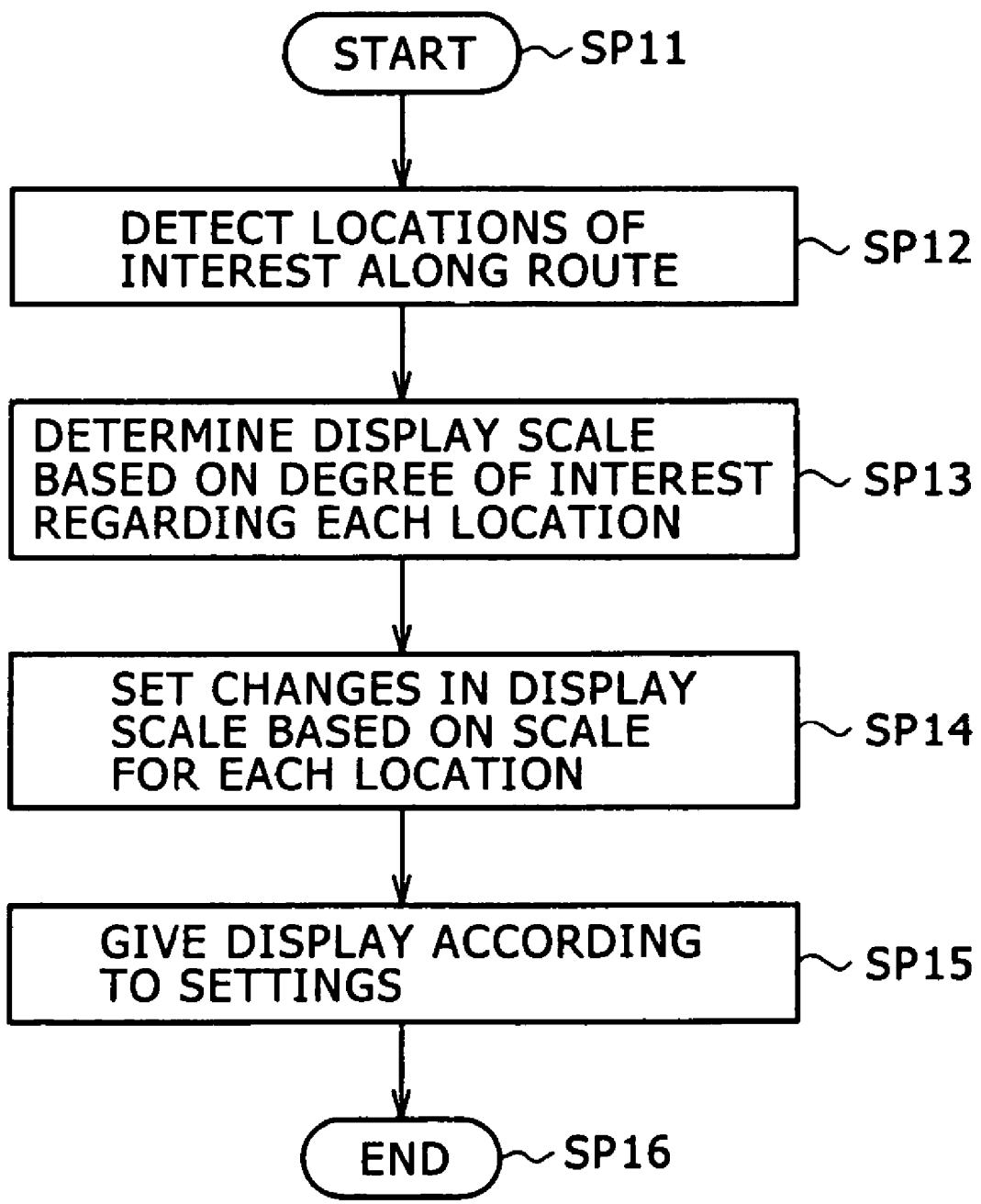
FIG. 7 is a flowchart of steps constituting a procedure carried out by the controller in simulating a route.

The controller 33 carries out the procedure shown in FIG. 7 to zoom in temporarily on the map display in accordance with the degrees of interest kept in advance. More specifically, when the user designates a route simulation, the controller activates the procedure in step SP11 and goes to step SP12. In step SP12, the controller 33 detects the stored landmarks, facilities and other locations of interest in view of the user's preferences in predetermined regions along the route from the current location to the destination. In step SP13, the controller 33 determines the scales of display at the center of the screen on the display device 37 based on the degrees of interest specific to the detected landmarks, facilities and locations. In this embodiment, the degree of interest is a parameter how much of the user's attention should be drawn to a given location. Accordingly, the higher the degree at which to draw the user's attention to a given landmark, the larger the value representing the degree of interest for that landmark. For that reason, the controller 33 makes the map scale larger the higher the degree of interest.

Figure 8:
FIG. 8 is a plan view of a map display given by the procedure of FIG. 7.

Suppose that, as shown in FIG. 8, the user designates a route simulation ranging from the current location (indicated by a triangular mark) to the destination (represented by a circular mark). In this case, the controller 33 determines a particular scale of map display in each of rectangular areas indicated by reference characters A through G in accordance with different degrees of interest specific to the landmarks and facilities in each of the indicated rectangular areas. In the example of FIG. 8, the area A covering the current location and the area G including the destination are assigned the highest degree of interest and thus given the largest scale for display. By contrast, the areas C, D and F representative of intersections and other landmarks are given lower degrees of interest than those for the current location and the destination and are thus assigned a smaller scale for display.

After setting the display scales for the locations of interest as described above, the controller 33 goes to step SP14. In step SP14, the controller 33 establishes changes in display scale based on the above settings along the route detected by the route simulation. As shown in FIG. 9, the controller 33 displays the map of each location of interest on the previously established scale for a predetermined period of time, in such a manner that the scale is varied at an appropriate rate of change before and after each landmark of interest, in the vicinity of the current location, and in the locality of the destination. As described earlier in connection with the procedure of FIG. 1, the zoom-out scale is subject to a predetermined limiting value when the scales are established along the route. In this case, the controller 33 sets the scales so that they are expressed by a linear function in which the variable is time.

In step SP15, the controller 33 zooms in and out on the map display in keeping with the scales thus established. The map display position is moved along the route in such a manner that the speed of movement along the route on the displayed map is kept constant while the scale is being changed as needed during the scroll. Thereafter, the controller 33 goes to step SP16 and terminates the procedure. Whereas the scrolling process performed by the procedure of FIG. 1 involves zooming in after the scroll, the scrolling process carried out by the procedure of FIG. 7 involves zooming in so as to restore the initial scale of display before ending the scroll.

(2) Operation of the First Embodiment

With the structure described above, the car navigation system 1 causes the display device 37 to display maps in response to the user's instructions and guides the user to the desired destination using the map indications. Given the map display, the user may verify the current location and scroll the display to check the surroundings or to find the facilities of interest. In some cases, the user may set the destination by scrolling the map display.

In the above cases, simply scrolling the display screen as usually done can be a time-consuming exercise and can even make it difficult for the user to keep track of the geographical relations between the current location and the detected destination. Trying to avoid losing track of what is being displayed requires the user to repeat zoom-out, scroll, and zoom-in operations.

By contrast, when the user gives a scroll instruction to this embodiment, the system starts scrolling while zooming out on the map display and, at the end of the scroll, zooms in on the display until the initial scale of the map is restored. As opposed to the usual way of scrolling with the initial scale kept intact, simple operations made by the user allow the inventive system to perform the scroll at a higher speed than before thanks to the zoom-out process involved. This prevents the user from losing track of what is being displayed and thus enhances the user's ease of operation by shortening the time required to perform the scroll.

When the scroll process is stopped halfway because the destination is detected, the scale of the map has been reduced by that time to a predetermined level. That makes it easier for the user to grasp the geographical relations between the current location and the destination. This is another feature of improving the user's ease of operation.

The scale of the zoom-out process during scrolling is subject to a predetermined limiting value. This measure is designed to prevent the map scale from getting too small to be practical, illustratively when the screen is scrolled vertically and horizontally for a long time in order to search for a hard-to-find destination. This is yet another feature of improving the user's ease of use.

A route simulation process with scrolling performed in known directions is a process in which the user verifies the route to the destination. When the locations, facilities, etc., associated with their degrees of interest are detected along the route, the map display is scrolled while temporary zoom-in and zoom-out processes are being carried out in such a manner that maps of the localities including the locations of interest are displayed on the scales corresponding to the varying degrees of interest involved. In this case, the system starts scrolling while zooming out on the map display and ends the scroll while zooming in on the display until its initial scale is restored. As opposed to the usual method of scrolling the map display with its initial scale kept unchanged during route simulation, the inventive system performs scrolling rapidly while preventing deterioration in visibility from the user's point of view. The reduced scroll time, combined with the ease of keeping track of topographical relations to the current location, contributes to the user's ease of operation. Temporary zoom-in processes carried out in keeping with the degrees of interest specific to the localities being transited make it possible to inform the user of diverse kinds of information effectively and reliably as needed during the route simulation. This is a yet further feature contributing to the user's ease of operation.

(3) Effects of the First Embodiment

The first embodiment of the above-described structure starts scrolling while zooming out on the target object in response to scroll instructions, and either zooms in on the target object until its initial scale is restored before ending the scroll, or terminates the scroll so as to zoom in on the object until its initial scale is restored, whereby the ease of use in scrolling is improved.

During scrolling, temporary zoom-in and zoom-out processes are carried out so as to display the maps of the localities covering the locations or facilities of interest on the scales corresponding to their degrees of interest. With the scroll time thus reduced, it is possible effectively and reliably to inform the user of various kinds of information needed by the user. The user's ease of operation is thus improved.

As described, the present invention practiced as the first embodiment may be applied advantageously to car navigation systems or to any other setups where the target object to be scrolled is the map. In any of these cases, the user's ease of operation is enhanced by the inventive arrangements of the embodiment.

Second Embodiment

A car navigation system practiced as a second embodiment of the present invention has basically the same structure as that discussed above in reference to FIGS. 1 and 2. The second embodiment is designed to let the speed of scroll be changed by operation of the remote commander 40 or the touch panel 39. That is, the scrolling speed and zooming processes are switched in response to the user's scrolling operations on the remote commander 40 or touch panel 39. On the remote commander 40, the scrolling speed is controlled by the amount in which a joystick is moved or by changes in pressure onto the controls for designating scrolling directions. On the touch panel 39, the scrolling speed is adjusted by changes in the pressure applied to the relevant keys. In addition to the mechanism for detecting scrolling directions, the second embodiment practiced as the car navigation system 1 has in its remote commander 40 and touch panel 39 the facility to detect the amount of scroll. The second embodiment is substantially the same in structure as the car navigation system 1 of the first embodiment except for the mechanism for processing the speed of scroll. For this reason, the second embodiment will be described below by referring to FIGS. 2 and 3 where appropriate.

When the user designates scrolling of the displayed map by operating the remote commander 40 or touch panel 39, the controller 33 in the second embodiment starts scrolling while zooming out on the map and ends the scroll by zooming up on the map until its initial scale is restored, in the same manner as discussed above in connection with FIGS. 1, 4 to 6A through 6C.

In the above series of processes, an appropriate degree of interest is set for each of the displayed localities in keeping with the scrolling speed employed by the user for the locality in question. In the same manner as described above with reference to FIGS. 8 and 9, the controller 33 zooms in temporarily on the map display in accordance with the degrees of interest involved. Illustratively, if the user designates scrolling at a low speed, a detailed map is displayed on a large scale; conversely, if the user specifies scrolling at a high speed, a map over a wide area is displayed on a small scale. Alternatively, the limiting value to which the zoom scale is subjected may be varied as desired in carrying out zoom-in and zoom-out processes during scrolling at the user-designated scrolling speed.

In a route simulation process where scrolling is made in known directions, the second embodiment also accepts the scrolling speed designated by the user. In this case, too, zoom-in and zoom-out processes are performed in accordance with the scrolling speed instructed by the user during the scroll in a manner such that the degrees of interest may translate into the scrolling speed to be observed, such that the scale limiting value may be varied in keeping with the scrolling speed being employed, or such that the scale reflecting the changes in display speed as described above with reference to FIG. 9 may be biased overall based on the user-designated scrolling speed.

The second embodiment starts scrolling while zooming out on the target object in response to scroll instructions, and either zooms in on the target object until its initial scale is restored before ending the scroll, or terminates the scroll so as to zoom in on the object until its initial scale is restored, in a manner such that the zoom-in and zoom-out processes are carried out in keeping with the user-designated scrolling speed. The user's intentions are thus better reflected in the scrolling process whereby the user's ease of operation is improved.

More specifically, if the scrolling speed is low, that means the user wants to check the map display in detail. In that case, the system zooms in on the map on a larger scale than before to enhance the user's ease of use. If the scrolling speed is high, that means the user wishes to get the vicinity of the destination displayed by rapidly scrolling the map. In this case, the system provides high-speed scrolling of the map displayed on a scale larger than that in effect when the scrolling speed was low, whereby the user's convenience is enhanced.

Third Embodiment

The foregoing embodiments were shown permitting the setting of scales for zoom-out and zoom-in processes using a linear function whose variable is time, whereby the map scale is changed in linear fashion. Alternatively, a third embodiment may be devised by replacing the linear function with a quadric, an exponential, or some other suitable function. In such cases, the characteristic of changes in scale for zoom-out and zoom-in processes may be determined as per the function in use. As another alternative, the changes in scale for zoom-out and zoom-in processes may be established by replacing the scale of display with the scheme of expressing the size of the display area using time as a variable.

In the foregoing embodiments, the system was shown zooming in and out temporarily on the map display in keeping with the degrees of interest involved only during rout simulation. However, this is not limitative of the invention. Alternatively, the system may be arranged to zoom in and out temporarily on the map display in accordance with the degrees of interest involved also during the ordinary scrolling discussed above with reference to FIG. 1.

Although the foregoing embodiments were shown applying the inventive facilities to the ordinary flat display of maps, this is not limitative of the invention. Alternatively, the invention may also be applied extensively to the so-called bird's-eye view display of maps.

The above-described embodiments were shown zooming out to give a display of an area getting larger in the scrolling direction and zooming in on the center of the display screen. Alternatively, the center for display in zoom-out and zoom-in processes may be varied as needed.

The above embodiments were shown applying the present invention to the display of maps by car navigation equipment. Alternatively, the invention may be applied extensively to the display of maps by personal computer or by other diverse devices. In addition to the display of maps, the present invention may be applied broadly to the display of design drawings including wiring patterns, photographs such as aerial photos, and three-dimensional structures and objects as viewed from diverse viewpoints.

As described, the present invention may be implemented advantageously as a displaying apparatus, a displaying method, a displaying program, and a recording medium which holds the displaying program; and particularly as a car navigation system.

As many apparently different embodiments of this invention may be made without departing from the spirit and scope thereof, it is to be understood, that the invention is not limited to the specific embodiments thereof except as defined in the appended claims.

The invention claimed is:

1. A displaying apparatus for displaying part of a target object on a display device, said displaying apparatus comprising:

inputting means for enabling inputs to be provided from a user; and controlling means for controlling the display device so as to switch the display of the target object in accordance with an input supplied from the inputting means;

the controlling means causes the display device to start scrolling the display of the target object in a scrolling direction designated by the user by use of the inputting means so as to zoom out on the target object in response to a scroll input from the inputting means, and to either zoom in on the target object until an initial scale of the target object is restored before ending the scroll or terminate the scroll so as to zoom in on the target object until the initial scale thereof is restored, and during the zoom out a center of the target object being displayed on the display device is moved in a direction opposite to the scrolling direction, and during operation, the controlling means establishes different degrees of interest at different locations of interest on the target object so as to alert the user, in which the different degrees of interest are established by the controlling means in accordance with past preferences of the user, the controlling means further causing the display device temporarily to zoom in and then to zoom out on the target object during the scrolling so that the scale of the target object will correspond to the degree of interest at each of the locations of interest.

2. The displaying apparatus according to claim 1, wherein the target object is a map.

3. The displaying apparatus according to claim 2, further comprising current location detecting means for detecting a current location;

wherein the controlling means performs a search for a route from the current location detected by the current location detecting means to a destination established through the inputting means, the controlling means further scrolling the display of the map along the route detected by the search.

4. The displaying apparatus according to claim 1, further comprising means for enabling the user to change a speed at which the scrolling is performed.

5. The displaying apparatus according to claim 1, in which the controlling means is operable to change scales of the target object during zoom in and zoom out operations in a non-linear manner.

* * * * *